United States Patent
Khare et al.

(10) Patent No.: US 12,081,420 B2
(45) Date of Patent: Sep. 3, 2024

(54) HISTORICAL DATA SUPPORT ENHANCEMENT FOR NETWORK ENTITIES

(71) Applicant: NOKIA TECHNOLOGIES OY, Espoo (FI)

(72) Inventors: Saurabh Khare, Bangalore (IN); Colin Kahn, Morris Plains, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/449,711

(22) Filed: Oct. 1, 2021

(65) Prior Publication Data

US 2022/0124015 A1 Apr. 21, 2022

(30) Foreign Application Priority Data

Oct. 1, 2020 (IN) .............................. 202041042795

(51) Int. Cl.
| | |
|---|---|
| H04L 43/06 | (2022.01) |
| H04L 43/022 | (2022.01) |
| H04L 43/028 | (2022.01) |
| H04L 43/04 | (2022.01) |

(52) U.S. Cl.
CPC ............ *H04L 43/06* (2013.01); *H04L 43/022* (2013.01); *H04L 43/028* (2013.01); *H04L 43/04* (2013.01)

(58) Field of Classification Search
CPC ..... H04L 43/06; H04L 43/022; H04L 43/028; H04L 43/04

(Continued)

(56) References Cited

U.S. PATENT DOCUMENTS

| | | | |
|---|---|---|---|
| 9,646,258 | B2 | 5/2017 | Enck et al. |
| 2016/0292016 | A1 | 10/2016 | Bussard et al. |

(Continued)

FOREIGN PATENT DOCUMENTS

| | | | |
|---|---|---|---|
| CN | 109952741 A | | 6/2019 |
| CN | 109997334 A | | 7/2019 |

(Continued)

OTHER PUBLICATIONS

"3rd Generation Partnership Project; Technical Specification Group Core Network and Terminals; 5G System; Access and Mobility Management Services; Stage 3 (Release 16)", 3GPP TS 29.518 v16.5.0, (Sep. 2020), 256 pages.

(Continued)

*Primary Examiner* — Karen C Tang
(74) *Attorney, Agent, or Firm* — ALSTON & BIRD LLP

(57) ABSTRACT

For example, within a communication network environment a possibility for retrieval of historical data indicative of events occurring within the communication network environment and obtained from one or more data sources within the communication network environment is provided. Selection criteria is specified at a first device to be applied to the historical data for a query to be performed on the historical data kept in a historical data repository associated with a second device. At least one processing instruction is specified at the first device. The processing instruction determines the generation of a report based on the defined query. The selection criteria and the processing instruction is transmitted to the second device, and the report generated at the second device based on the transmitted selection criteria and processing instruction is received.

20 Claims, 8 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2017/0091642 A1 | 3/2017 | Enck et al. | |
| 2019/0238425 A1 | 8/2019 | Mladin et al. | |
| 2019/0319863 A1 | 10/2019 | Gupta et al. | |
| 2020/0053802 A1 | 2/2020 | Li et al. | |
| 2020/0137174 A1* | 4/2020 | Stammers | H04L 67/141 |
| 2020/0228420 A1* | 7/2020 | Dao | H04L 41/40 |
| 2020/0329008 A1* | 10/2020 | Dao | G06F 16/953 |
| 2020/0367045 A1* | 11/2020 | Jeong | H04W 8/08 |
| 2021/0392540 A1 | 12/2021 | Chong et al. | |
| 2022/0070071 A1* | 3/2022 | Poe | H04L 43/12 |
| 2022/0070702 A1* | 3/2022 | Puente Pestaña | H04W 8/186 |

FOREIGN PATENT DOCUMENTS

| | | |
|---|---|---|
| CN | 111614563 A | 9/2020 |
| GB | 2593217 A | 9/2021 |
| WO | WO 2020/143373 A1 | 7/2020 |
| WO | WO-2022003407 A1 * | 1/2022 |

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288 v16.5.0, (Sep. 2020), 66 pages.

"3rd Generation Partnership Project; Technical Specification Group Services and System Aspects; Study of Enablers for Network Automation for 5G (Release 16)", 3GPP TR 23.791 v16.2.0, (Jun. 2019), 124 pages.

"3rd Generation Partnership Project; Technical Specification Group Services and System Aspects; Study on enablers for network automation for the 5G System (5GS); Phase 2 (Release 17)", 3GPP TR 23.700-91 v1.0.0, (Sep. 2020), 304 pages.

"3rd Generation Partnership Project; Technical Specification Group Services and System Aspects; System architecture for the 5G System (5GS); Stage 2 (Release 16)", 3GPP TS 23.501 v16.6.0, (Sep. 2020), 447 pages.

"5G; System Architecture for the 5G System (3GPP TS 23.501 version 15.3.0 Release 15)", ETSI TS 123501 v15.3.0, (Sep. 2018), 227 pages.

"Overview of Azure Steam Analytics—Microsoft Docs", Retrieved on May 27, 2022, Retrieved via the Wayback Machine <URL:https://web.archive.org/web/20200919082911/https://docs.microsoft.com/en-us/azure/stream-analytics/stream-analytics-introduction>, (Jul. 6, 2020), 6 pages.

Extended European Search Report for European Application No. 21199670.7 dated Jun. 7, 2022, 12 pages.

Office Action for Chinese Application No. 202111173141.X dated Dec. 23, 2023, 21 pages.

Office Action for European Application No. 21199670.7 dated Apr. 23, 2024, 9 pages.

* cited by examiner

HISTORICAL DATA SUPPORT ENHANCEMENT FOR NETWORK ENTITIES

CROSS-REFERENCE TO RELATED APPLICATIONS

This application claims priority to India Application No. 202041042795, filed Oct. 1, 2020, the entire contents of which are incorporated herein by reference.

TECHNICAL FIELD

At least some example embodiments relate to historical data support enhancement for network entities. In particular, at least some example embodiments relate to historical data support enhancement for a Network Data Analytics Function (NWDAF) or a Data Collection Coordination Function (DCCF) which are examples of such network entities.

List of Abbreviations/Acronyms

3GPP 3$^{rd}$ Generation Partnership Project
3CA 3G_Consumer Adaptor
3PA 3G_Producer Adaptor
5GC 5G Core Network
AF Application Function
AMF Access and Mobility Management Function
API Application Programming Interface
BSF Binding Support Function
CA Consumer Adaptor
CCA Client Credentials Assertion
DA DCCF Adaptor
DCCF Data Collection Coordination Function
NEF Network Exposure Function
NF Network Function
$NF_c$ Network Function Consumer
$NF_p$ Network Function Producer
NRF Network Repository Function
NWDAF Network Data Analytics Function
OAM Operation, Administration, and Maintenance
PCF Policy Control Function
SCP Service Communication Proxy
SMF Session Management Function
S-NSSAI Single-Network Slice Selection Assistance Information
TAI Tracking Area Identifier
UDM Unified Data Management
UE User Equipment

BACKGROUND

For understanding the present invention, some knowledge about the principles of a historical data collection and/or evaluation at a network entity such as for example a NWDAF as e.g. defined in 3GPP TS 23.288 is helpful.

Reference to the NWDAF and the standard mentioned is intended to serve as a mere example and not be considered as limiting the disclosure of the invention. Other network entities defined under different existing or to be developed standards may similarly benefit from at least exemplary aspects disclosed hereinafter.

The NWDAF was first defined in the 3GPP Release 15 and extended in Release 16 and thereafter manifested in 3GPP TR 23.791. The NWDAF calculates analytics based on data collected from different data sources, such as the Access and Mobility Management Function (AMF), Session Management Function (SMF), Policy Control Function (PCF), Unified Data Management (UDM), Application Function (AF), and Operation, Administration, and Maintenance (OAM), or any other data sources within a communication network. It offers analytics identified by a 3GPP defined analytics identifier to data consumers (also a network entity) using the services based on the architecture defined for the 5GC.

For TR 23.700-91, a data management framework is already proposed as a solution for several key issues. One example of such a data management framework is depicted in FIG. 1. The solution is documented as solution #9 in TR 23.700-91.

Further, the formatting of notification is already defined in solution #9, where the DCCF/Messaging framework can filter the notifications based on given criteria.

For instance, the formatting can be a clubbing (or combination) of multiple notifications together based on time or events. However, clubbing or other formatting will not reduce the amount of data sent via notifications.

For example, if the data management framework is used to retrieve historical data from a repository where there are 500.000 applicable notifications and the size of each notification is 1 KB, then 500 MB of notification data needs to be passed from the DCCF/Messaging framework to the data consumer. That is, clubbing or any other formatting approach that is currently proposed will not reduce the volume of data to be transferred.

Currently, historical data is typically used for statistical purposes, such as for example Determination of the location of a user equipment (UE) in a certain area for how many times for a certain duration, Determination of how many calls were made by all UEs registered in a certain area during a certain time, Determination of how many times AMF was overloaded last year etc., Determination of how many people make a call/use texting at Time Square during e.g., New Year's Eve, so that the operator can plan the network expansion accordingly.

So far, there is no way to obtain, from the data management framework or data repository, a report containing statistics derived from historical data. In the existing solution the data consumer (e.g., the NWDAF) receives all historical data and then calculates the statistics or generates a report itself.

For example, in case the data repository keeps the record of a terminal device such as a user equipment UE1 and its UE1 mobility (Tracking Area Identifier (TAI) change) notification records, over a period, a huge data volume may be stored, e.g., 5 million notifications are stored over 3 years.

If the NWDAF is now interested in knowing the frequency or count of UE1 movements for a certain TAI1 and TAI2 over the last 3 years, then NWDAF queries the DCCF/data repository. Then the DCCF/data repository returns 50,000 notifications (AMF notification objects) out of 5 million notifications. These 50.000 notification objects need to be passed from the data repository/DCCF to the data consumer such as the NWDAF.

Moreover, one notification object received from AMF/SMF, typically has a lot of additional attributes related to an event. If one evaluates the size of the notification including those additional attributes, it will be significant. As per TS 29.518 Section 6.2.6.2.5 Type: AmfEventReport (which is a notification object for any kind of event), there are approximately 25 parameters that AMF fills for different notifications.

Therefore, the existing data management framework solution with notification formatting, will reduce the number notification messages, but not the amount of data. The NWDAF still needs to process all notifications (i.e., a huge amount of data) in the messages to determine the statistics and prepare a desired report.

In addition, historical data is becoming important for NWDAF processing. Historical data may be stored in the NWDAF or any Network Function (NF) supporting a repository. There can be a DCCF/Messaging framework based repository or local repository attached to the NWDAF/NF.

If there is a local repository attached to the NWDAF1/NF1 where NWDAF1/NF1 stores the notifications, and if another NWDAF2 wants to obtain the data from NWDAF1/NF1, the same problem will arise because NWDAF2 needs to obtain all the relevant notifications, which may constitute a huge data volume.

SUMMARY

It is an objective of at least some example embodiments to improve the prior art.

This objective is achieved by the methods, apparatuses and non-transitory storage media as specified in the appended claims. More particularly, such improvements are as set out in the respective independent claims 1, 4, 11, 14, 21 and 22.

Advantageous further developments are set out in respective dependent claims.

Further, computer program products, comprising computer executable code, which, when executed by a processor, perform the method according to any of the method aspects are provided.

That is, while solution #9 in TR23.700-91 described above basically describes the data management framework and how data may be formatted, at least aspects of the present invention improve such prior art in that the data management framework is enabled to generate reports/statistics based on historical raw data (e.g., notifications).

According to at least some example embodiments, at least one of the following advantages are achieved:

- The consumer (e.g., NWDAF) is not required to download the full data.
- Latency is optimized for NWDAF processing.
- The bandwidth necessary to transport raw data to the consumer is eliminated,
- The tailoring of data delivered to a data consumer described in the present application may be implemented by the data management framework described in solution #9 of TR23.700-91.
- While in the pre-existing solution, the data consumer such as NWDAF was the only entity that can apply a statistical analysis such as calculate that the number of e.g. UE1 movements is a certain number, of 50000 times, according to at least some aspects of the invention, it is enabled that the data management framework or data repository can send such statistical analysis/report to the data consumer such as NWDAF stating that the count is a certain number of e.g. 50,000.
- In this way, the data traffic over the interfaces within the arrangement is greatly reduced.
- There is now an option available which enables to obtain just the reports/statistics which e.g. gives the counts of NF notifications (e.g., AMF notification/SMF notifications) for a specific event, so that the data transmitted via the interface to the data consumer entity is greatly reduced and the processing load for the data consumer is significantly removed.

In the following table a comparison between the necessary transmitted data amount in the existing solution and the necessary transmitted data amount according to at least some example embodiments is shown.

Hereby, it is assumed that 1 million notifications are stored in, e.g., the following manner:

| | |
|---|---|
| Notification1: AMF_EE_notification Parameter 10} | {UE1, TAI1, Time: xyz.., Parameter1.. |
| Notification2: AMF_EE_notification Parameter 10} | {UE1, TAI1, Time: xyz.., Parameter1.. |
| Notification3: AMF_EE_notification Parameter 10} | {UE1, TAI1, Time: xyz.., Parameter1.. |
| ... | |

Further, it is assumed that this will take 100 MB data to transfer over the wire.

| Option | How it will be sent | Size over the wire |
|---|---|---|
| Filtering/clubbing based on existing TR 23.700-91 Solution #9 | Notification1: AMF_EE_notification { {UE1, TAI1, Time: xyz, Parameter1,.. Parameter 10.} {UE1, TAI1, Time: xyz, Parameter1,.. Parameter 10.} {UE1, TAI1, Time: xyz, Parameter1.. Parameter 10.} } | 50-60 MB based on filtering (number of notification to be sent) |
| Report defined in at least some example embodiments | Notification1 AMF_EE_Notification { UE1: 1234556789012345 Count: 100000 } | Less than 1 KB |

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the attached drawings, wherein.

DETAILED DESCRIPTION OF CERTAIN EXAMPLE EMBODIMENTS

Herein below, certain aspects are exemplified by at least some embodiments which are described in detail with reference to the accompanying drawings. Features of the example embodiments can be freely combined with each other unless otherwise described. However, it is to be expressly understood that the description of certain example embodiments/aspects is given by way of example only, and that it is not intended to be understood as limiting the application to the details disclosed.

It is to be understood that any of the modifications mentioned can be applied singly or in combination to the respective aspects to which they refer, unless they are explicitly stated as excluding alternatives.

Moreover, it is to be understood that the apparatus is configured to perform the corresponding method, although in some cases only the apparatus or only the method are described.

According to at least some example embodiments, within a communication network environment a possibility for retrieval of historical data indicative of events occurring within the communication network environment and obtained from one or more data sources (e.g., NWDAF, NF, AF and NEF) within the communication network environment is provided. Further, a first device (e.g., a data consumer) specifies selection criteria to be applied to the historical data for a query to be performed on the historical data kept in a historical data repository associated with a second device (e.g., a data management framework, a data consumer, or a data source). In addition, at the first device at least one processing instruction (e.g., an output template/ report template) is specified. The at least one processing instruction determines the generation of a report based on the defined query. Then, the selection criteria and the processing instruction is transmitted to the second device, and thereafter the report generated at the second device based on the transmitted selection criteria and processing instruction is received.

Figure 1:
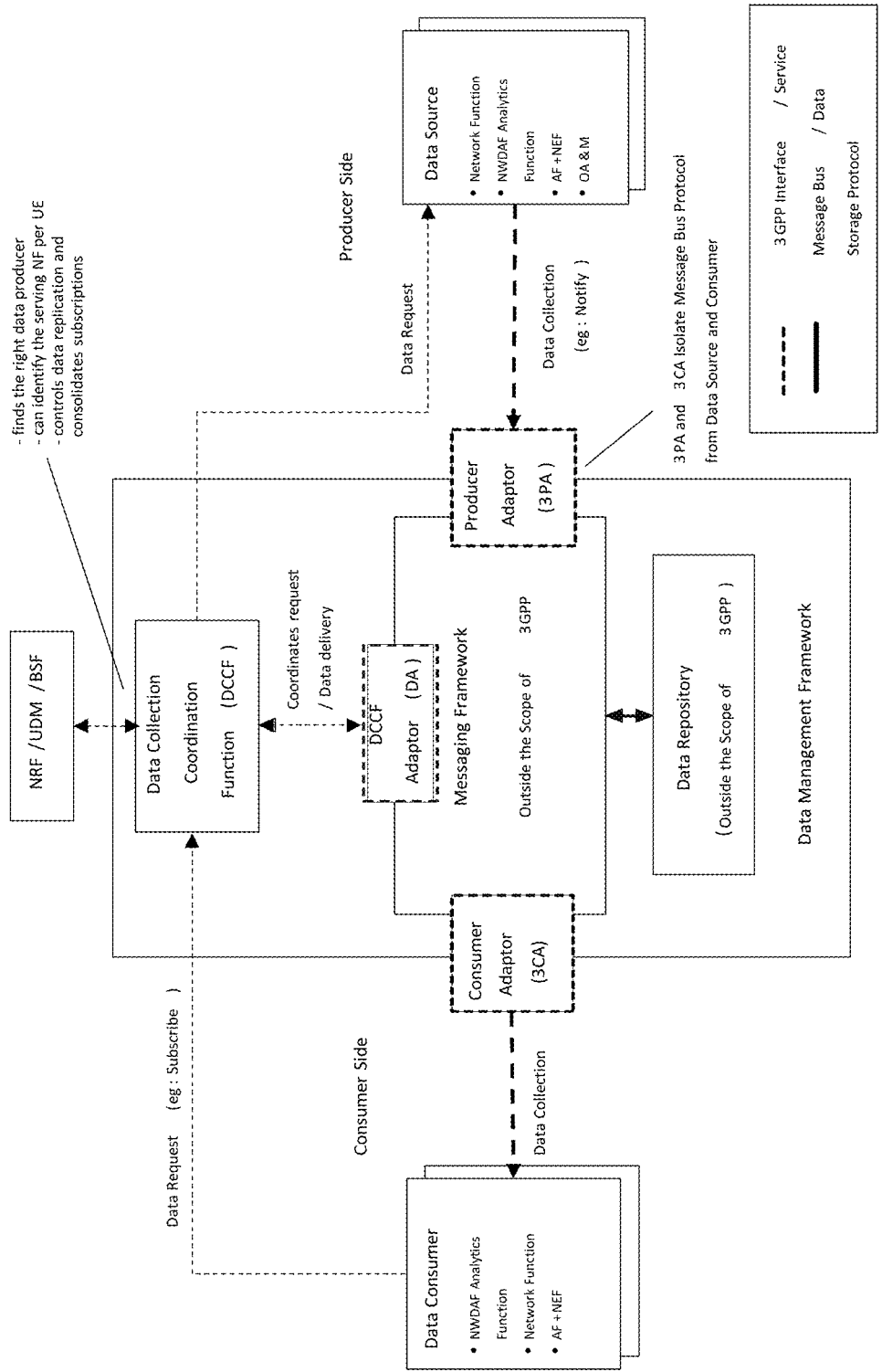
FIG. 1 shows an example data management framework for 5GC as proposed by the solution #9 from 3GPP TR 23.700-91.
Figure 2:
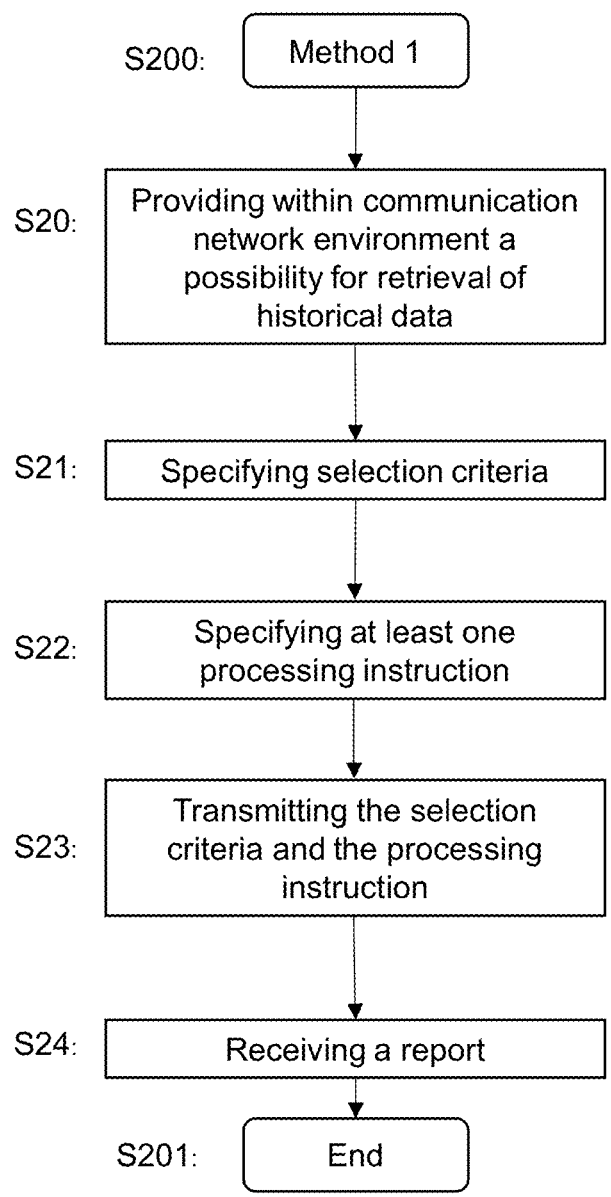
FIG. 2 shows a flowchart illustrating an example method 1 according to at least some embodiments.

In FIG. 2, a method 1 according to at least some example embodiments is illustrated. According to an exemplary example, at least several steps illustrated are allocated to be performed by the data consumer.

Method 1 starts in S200: Then, within a communication network environment a possibility for retrieval of historical data indicative of events occurring within the communication network environment and obtained from one or more data sources within the communication network environment is provided (S20). Then, selection criteria to be applied to the historical data for a query to be performed on the historical data kept in a historical data repository associated with a second device is specified at a first device (S21). Further, at least one processing instruction is specified at the first device (S22), wherein the processing instruction determines the generation of a report based on the defined query. Then, the selection criteria and the processing instruction are transmitted to the second device (S23), and the report generated at the second device based on the transmitted selection criteria and processing instruction is received (S24). Thereafter, the method ends (S201).

According to at least some example embodiments the method further comprises discovering the second device by inquiring a third device (e.g. a network repository function (NRF)), and receiving an indication of the second device from the third device based on a capability of the second device registered at the third device. Further, the capability represents the possibility for retrieval of historical data indicative of events occurring within the communication network environment.

According to at least some example embodiments the capability of the second device comprises the duration for which historical data is stored in the associated historical data repository.

Figure 3:
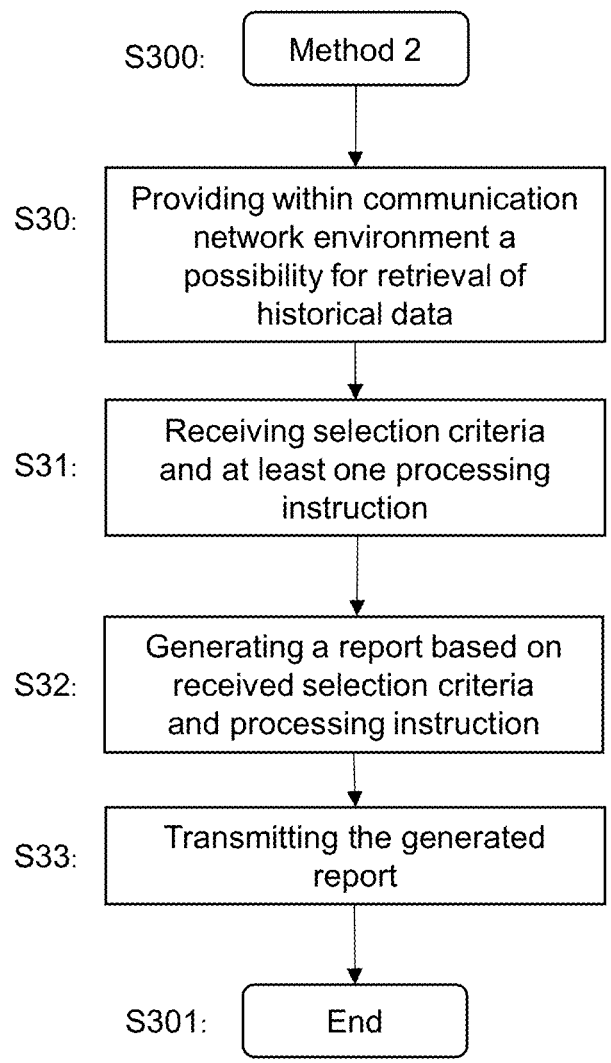
FIG. 3 shows a flowchart illustrating an example method 2 according to at least some embodiments.

Further, in FIG. 3, a method 2 according to at least some example embodiments is illustrated. According to exemplary examples, at least several steps illustrated are allocated to be performed by the data management framework DMF and/or the data source and/or another data consumer.

Method 2 starts in S300. Within a communication network environment a possibility for retrieval of historical data indicative of events occurring within the communication network environment and obtained from one or more data sources within the communication network environment is provided (S30). Then, selection criteria, to be applied to the historical data for a query to be performed on the historical data kept in a historical data repository associated with a second device, and at least one processing instruction are received from a first device, and wherein the processing instruction determines the generation of a report based on the defined query (S31). After that, the report is generated based on the received selection criteria and processing instruction (S32). Then, the generated report is transmitted to the first device or to another device indicated by the first device (S33) and method 2 ends (S301).

According to at least some example embodiments, the generating of the report based on the received selection criteria and processing instruction comprises retrieving historical data from the historical data repository associated with the second device based on the selection criteria, providing the received processing instructions to a processor unit of the second device, and processing, by the processor unit, the retrieved historical data based on the received processing instruction to generate the report.

According to at least some example embodiments, method 2 further comprises providing a new service capability (e.g., an application programming interface (API)) at the second device, and registering the second device with its configured capability at a third device (e.g., NRF), wherein the capability represents the possibility for retrieval of historical data indicative of events occurring within the communication network environment.

According to at least some example embodiments, method 2 further comprises collecting historical data from at least one data source, and storing the collected historical data in the historical data repository associated with the second device.

According to at least another example embodiments, the capability of the second device comprises the duration for which historical data is stored in the associated historical data repository.

In at least some example embodiments the events occurring within the communication network environment are one or more of presence of user equipment in a predetermined area within a predetermined time duration, number and/or type of used services, number of times a access and mobility management function (AMF) was overloaded within a predetermined time duration, and the one or more data sources is one or more of network function (N F); network data analytics function (NWDAF); application function (AF) and network exposure function (NEF); and operation, administration, and maintenance (OAM).

According to at least some example embodiments, the selection criteria comprise at least one of a plurality of events and metadata related thereto.

Further, according to at least some example embodiments, the generated report may be a statistical evaluation of one more of the frequency or count of UE movements, a location distribution, time for which a UE was located in a certain area, and/or any other statistical evaluation.

In the above some general aspects of at least some example embodiments were presented. With respect to FIG. 4 an example framework according to at least some exemplary embodiments is described.

Figure 4:
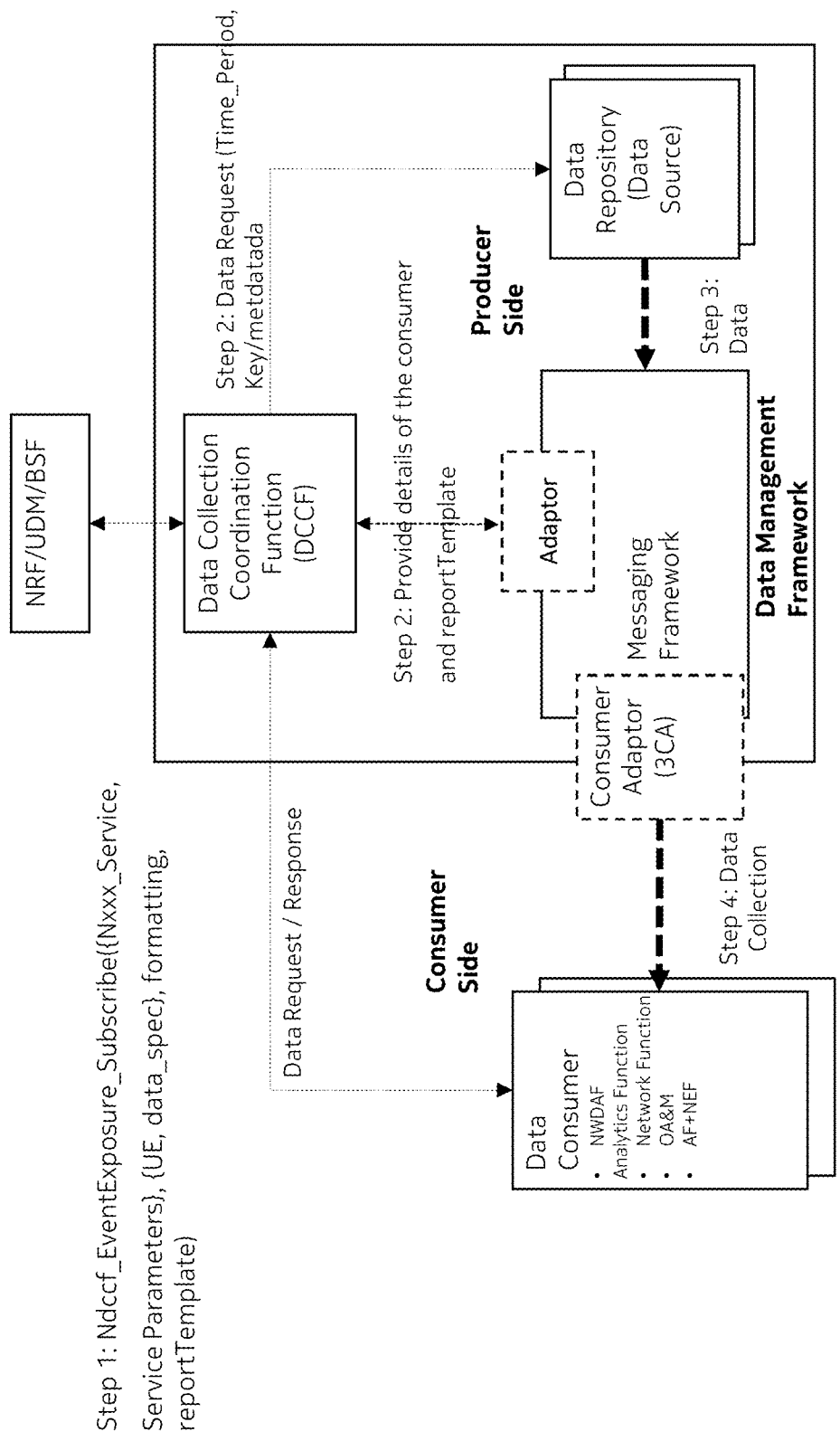
FIG. 4 shows a signaling diagram illustrating one example embodiment of the present application within an example framework.

In FIG. 4, as an example of a first device, a data consumer is shown on the left side. Further, as an example of the second device, a data management framework is depicted.

Further, in FIG. 4 an exemplary processing between devices is shown. First, in step 1 the data consumer (e.g. a NWDAF, NF) initiates (in its role as "first device") a service request to retrieve the historical data from the data management framework. Therefore, it may use, e.g., the following request:

---
Ndccf_EventExposure_Subscribe
 ({Nxxx_Service, Service Parameters}, {UE, data_spec}, formatting, reportTemplate)
---

According to at least an example embodiment/modification, the first device may include information indicating another device to which the report retrieved from the historical data is to be transmitted. The report can be transmitted either to first device, or to the another device, or optionally to both, the first and the another device. Still further, the number of another devices is not necessarily limited to one another device, but plural another devices may be indicated, e.g. based on network address identifiers allocated to the devices.

Further, one benefit of using the data management framework to retrieve historical data is that it off-loads the handling of masses of notifications from the data consumer to the consumer adaptor (3CA). That is, because queries to a data repository for data over a certain time period have the potential to create a huge flood of notifications to the data consumer, and data repositories as generic storage are less likely to provide aggregation than NFs, especially if they are not standardized by 3GPP.

In addition, parameters of the API are the same as those used to retrieve the data from a network function (e.g. AMF or SMF).

For example if the data consumer wants to retrieve the historical data for NF Type AMF, UE reachability notifications, then he may use the following:

---
Ndccf_EventExposure_Susbcribe
 ({Namf_EventExposure_Susbcribe, Service Parameters (UE identity=123456789012345, Event= UE tracking area change, TAI=TAI1, TAI2, TAI3.. TAI10, TimePeriod: Jan 2019 to Jan 2020}
 ReportTemplate: {CountOfNotification } }
---

Here the data consumer wants to retrieve the count of TAI changes of a user equipment identifiable by e.g. its equipment identity 'UE=123456789012345' in the duration from January 2019 to January 2020.

The report template (processing instruction) defines that the data consumer is not interested in the actual data or notifications. However, the data consumer wants the data management framework to process the query and provide just the report defined by the report template.

In this example embodiment it is assumed that there are 200.000 notifications stored in the data repository.

Then, in step 2 the DCCF queries the repository based on the input received from the data consumer. The DCCF also provides the reportTemplate details to a data adaptor.

In step 3 the data repository provides the data (in this example 200.000 notifications) back to the Messaging framework. The Messaging framework provides the same to the 3CA.

The 3CA consumes the 200.000 notifications and generates the report/statistics according to the reportTemplate.

Afterwards, in step 4, the 3CA sends a notification containing only the report, not the actual notification data to the data consumer, wherein one example of such report is shown below:

---
N3ca_EventExposure_Notification
 ( { UE= 123456789012345, CountOfNotification= 200000}.
---

Figure 5:
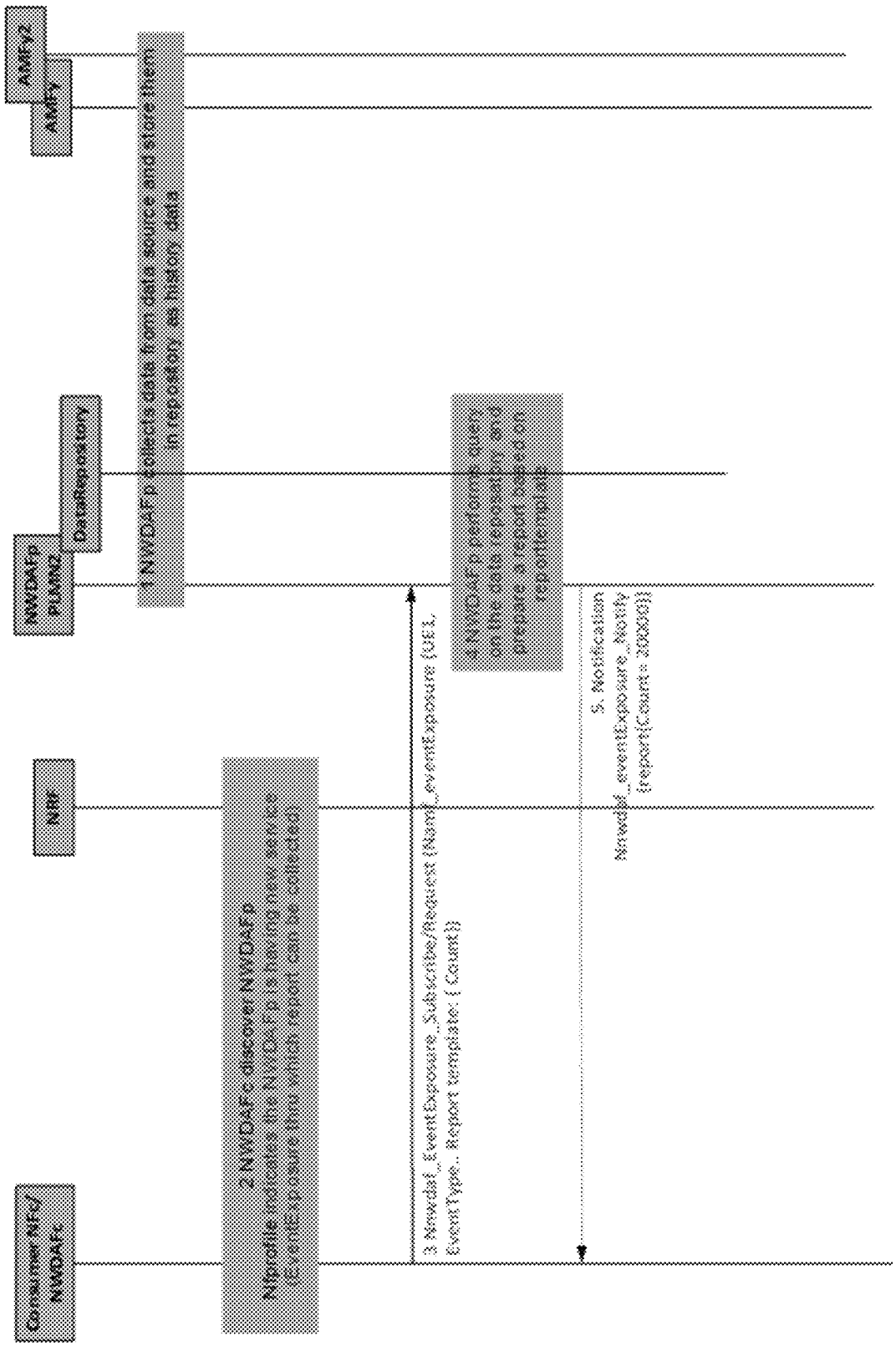
FIG. 5 shows a signaling diagram illustrating another example embodiment of the present application.

FIG. 5 depicts an example flowchart of an example embodiment of another configuration. According to at least some exemplary embodiments, in such configuration, the first device and the second device are consumer devices.

That is, in case NWDAFp has a repository where it stores the data (notifications) received from a data source as historical data, then another NWDAFc can query NWDAFp to retrieve the reports.

In this case, NWDAFp needs to provide a new API (which may be similar to the one defined for Ndccf), where the query defines the reports to be obtained from the NWDAFp.

In step 1 the NWDAFp registers in the NRF, indicating in its profile a new service or service option supporting historical data report retrieval. Afterwards, in step 2, the NWDAFc discovers the NWDAFp, which supports historical data report retrieval. In step 3 the NWDAFc sends a service request such as an Nnwdaf_EventExposure- _Susbcribe request (similar to the description of FIG. 4), wherein the request contains the reportTemplate (processing instruction). In step 4, the NWDAFp performs the query in the repository and prepares the report according to the reportTemplate. Lastly, in step 5 the NWDAFp sends a report back to the NWDAFc.

According to at least some (modified) example embodiments, the first device is a consumer device and the second device is a data source.

In such case, e.g. if the NF is supporting historical data, then the NF registers in the NRF and indicates in its profile a new service or service option that allows historical data and report retrieval, including the duration for which historical data is stored. A data consumer discovers the NFs, and NF profile information, including the duration (e.g., 6 months) and report capability. If the data consumer wants, it can retrieve the data or report from the NF via the above-described solution of at least some example embodiments.

So far, general example embodiments have been described. However, in the following a detailed explanation is given for a case in which the second device is a DCCF.

First, a detailed description of an example DCCF itself is provided. Second, a detailed description of an example messaging framework is provided.

The DCCF is a control-plane function that coordinates data collection and triggers data delivery to data consumers. A DCCF may support multiple data sources, data consumers and message frameworks. However, to prevent duplicate data collection, each data source is associated with only one DCCF.

Figure 6:
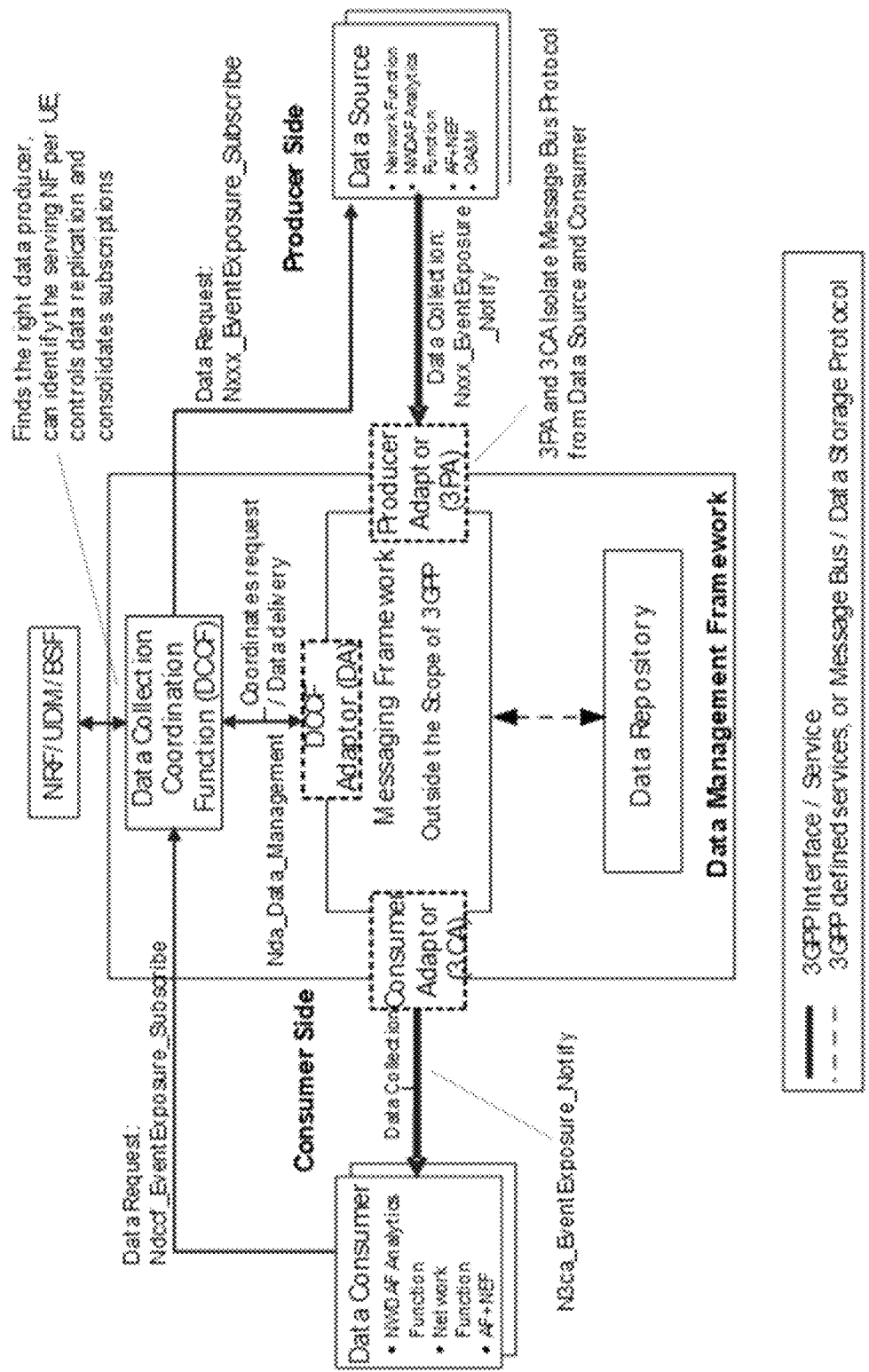
FIG. 6 shows another example data management framework for 5GC.

Further, the DCCF provides the 3GPP defined Ndccf_EventExposure Service to data consumers (e.g., NWDAFs), and uses the services of data sources (e.g., NF) to obtain data. FIG. 6 shows one example DCCF for the 5GC. However, there can be multiple instances of the DCCF, e.g., for network slices, geographic regions where data sources reside or for different data source types. A DCCF needed by a data consumer can be discovered using the NRF as described below.

It is to be noted that the DCCF is aware of the data sources which it is coordinating. The NRF and UDM can provide the DCCF with the identity of 5GC data sources (e.g., an AMF serving a UE). The DCCF also hides data source life cycle events and changes of entities serving a UE from the data consumer. For example, if an NF data source that serves a UE changes because of a life-cycle event, the NRF may notify a DCCF that has previously subscribed to the NRF via event notifications. The DCCF may also use the UDM to learn the new (UE, NF) association, thus making the change of UE serving NF transparent to the data consumer. The NRF identifies only the 5GC NF sources.

It is further to be noted that if there is more than one DCCF, they may coordinate the collection and distribution of data for orthogonal sets of data sources. In this case, a data consumer discovers the DCCF for the data it needs, and the DCCF and the message framework delivers the data from the proscribed set of data sources. If a DCCF cannot serve a request from a data consumer it may query the NRF to determine an acceptable DCCF and redirect the query accordingly.

In addition it is to be noted that the DCCF is not intended to support the aggregation of analytics data across multiple NWDAFs. However the DCCF keeps track of consumer requests to the NWDAF "data source", and hence knows what analytics are being produced by an NWDAF. Therefore the data management framework can be used by a data consumer (e.g., NWDAF) that consumes (e.g. aggregates) analytics data from one or more NWDAFs acting as a "data source" or from the data repository. The NWDAF acting as "data source" supplies analytics output as "data", using the services defined in TS 23.288 clause 7 (subscribe/notify), similar to any other NF. The DCCF keeps track of consumer requests to the NWDAF "data source", and hence knows what analytics are being produced by an NWDAF.

Moreover, the DCCF receives data requests from data consumers via the Ndccf_EventExposure service. A data consumer may be a NWDAF (Rel-17 NWDAF) and the contents of the service requests are based on Rel-16 services (e.g., AMF or SMF event exposure). The DCCF service may provide additional functionality, for example to allow one request that requires multiple data sources (e.g., AMF and SMF), and allow formatting and processing of notifications according to conditions specified by the data consumer as described in the list below.

Further, if the data source is not specified in the data request, the DCCF determines the data source that can provide the data requested by the data consumer (e.g., an event requested by the data consumer for NF event exposure). For example, if the request is for UE specific data, the DCCF may query the NRF/UDM/BSF to determine which NF instance is serving the UE, as described in TS 23.288 Table 6.2.2.1-2.

If the data source is specified in the data request, the DCCF checks whether the data is already collected from the data source. If not, it will request the data from the specified data source.

Further, the DCCF checks if the data consumer is authorized to access the DCCF services using the procedures specified in TS 23.501 clause 7.1.4 "Network Function Service Authorization".

Moreover, the DCCF determines if the requested data is currently being produced by any data source and sent to the messaging framework. If the requested data is not being produced, a new subscription/request is sent towards the data source to trigger a new data collection and the DCCF then subscribes with the messaging framework for the data consumer to receive future notifications. Similarly, when the last data consumer of a specific data is not interested in data any longer, the DCCF cancels the data collection from the data source and from the messaging framework. This ensures that the data source is only producing the same data once when there are multiple data consumers and does not produce data that no data consumer needs.

Further, the DCCF determines if data is already being collected by maintaining a record of the prior requests it has made for data (e.g., via an Nnf_EventExposure service offered by the data source). If parameters in a prior request for data match those that are needed in a subsequent request, the DCCF may determine that the requested data is already being collected. The DCCF may then subscribe with the messaging framework for the new data consumer to receive future notifications.

Moreover, formatting conditions and processing requested by data consumers via the Ndccf_EventExposure service may be passed to the messaging framework via the Nda_Data_Management Service. The 3CA may then send notifications to the data consumer, accordingly. Formatting determines when a notification is sent to the consumer, wherein formatting may include for instance:

Notification event clubbing (buffering and sending of several notifications in one message)

A notification time window (e.g., notifications are buffered and sent between 2 and 3 AM)

Cross event reference-based notification (when a subscribing NF is subscribing to multiple events (e.g., event X and event Y), the notification for an event X is buffered and reported only when the event Y occurs)

Consumer triggered notification

Exact time-based notification without the event (data is reported at an exact time, irrespective of whether the event occurs or not, e.g., every 30 minutes).

Mathematical calculation based notification (e.g., an exponential time window: the first notification is sent after 5 minutes, then the next notification is sent after 10 minutes, and the third notification is sent after 15 minutes etc.)

Moreover, processing aggregates notifications from the same data source to reduce the volume of data reported from the 3CA to the data consumer. This is particularly useful when data from a data repository (historical data) is requested that comprises a large number of notifications. The type of processing is specified by the consumer and may result in joining the information from multiple notifications in a common report.

When the DCCF receives a request for historical data (e.g., an NWDAF requesting analytics previously generated by another NWDAF), the DCCF may trigger retrieval of the data from the data repository and make it available over the messaging framework.

Further, the DCCF manages subscription requests and cancellations to the messaging framework on behalf of data consumers. The DCCF may use a native messaging framework protocol or alternatively a 3GPP defined protocol with an adaptor that translates to the messaging framework protocol (as depicted in FIG. 6).

If standalone 3PAs and 3CAs are used, the DCCF maintains the (NF, 3PA) and (NF, 3CA) associations.

For DCCF discovery, the DCCF registers with the NRF and is discovered by data consumers or the Service Communication Proxy (SCP) using the registration and discovery procedures defined for the network function service framework in TS 23.502 clause 4.17. The DCCF profile in the NRF may specify:

1. The slices (S-NSSAIs) that the DCCF supports
2. The source types that a DCCF coordinates
3. The serving area (e.g., a list of TAIs) containing data sources that the DCCF coordinates Further, the source type may correspond to an NF Type (e.g., SMF, AMF, etc.), or different domains (e.g., OAM). Hence a consumer or SCP may request or select a DCCF according to the type of information it is requesting, its supported network slices and its serving area.

In the following a detailed description of an example messaging framework is given.

The messaging framework contains messaging infrastructure that propagates event information and data (e.g., streaming and notifications) from data sources to data consumers. The messaging framework may support the pub-sub pattern, where data is published by producer adaptors (or data source if the data source natively supports the message bus protocol) and can be subscribed to by a consumer adaptor (or data consumers if the data consumer natively supports the message bus protocol).

Further, the messaging framework may support multiple event delivery mechanisms such as best effort or guaranteed delivery. For 3GPP purposes guaranteed delivery of events may be utilized.

The messaging framework may contain one or more adaptors that translate between 3GPP defined protocols (e.g., Rel-16 Nnwdaf_AnalyticsSubscription_Notify) and a data forwarding protocol not specified by 3GPP. The messaging framework adaptors maintain subscription information, including formatting conditions and processing instructions received by the DCCF Adaptor (DA).

The adaptor on the producer side (3PA) allows any source data (e.g.: from Rel-16 OAM or NF EventExposure) to be distributed via the framework without impact on the data source. The DCCF keeps track of the adaptor instances. An adaptor may be associated with specific NF types and/or instances, manage one or more data sources, and can be discovered by registering the sources (e.g., NFs) it supports with the DCCF. If the messaging framework directly supports 3GPP interfaces, adaptors may not be required.

In the following another specific example procedure within the framework (not shown as such) is described with reference to FIG. 7. Namely, a procedure for data collection and distribution for event notifications (subscribe/notify). The procedure illustrates how the DCCF manages data sources so that data is produced only once and illustrates how the DCCF interacts with the messaging framework so that data is distributed to all subscribed data consumers. The procedure applies for data consumers and producers using 3CA and 3PA, i.e., all steps are within 3GPP remit.

Further, data handled by the messaging framework is associated with an identifier. This example procedure assumes that the messaging framework uses a pub/sub model based on "topics", and hence a topic is that identifier. Therefore, the 3PA publishes a "topic" and a 3CA that wishes to receive the data subscribes to the "topic". However, other options may be supported as well.

Figure 7:
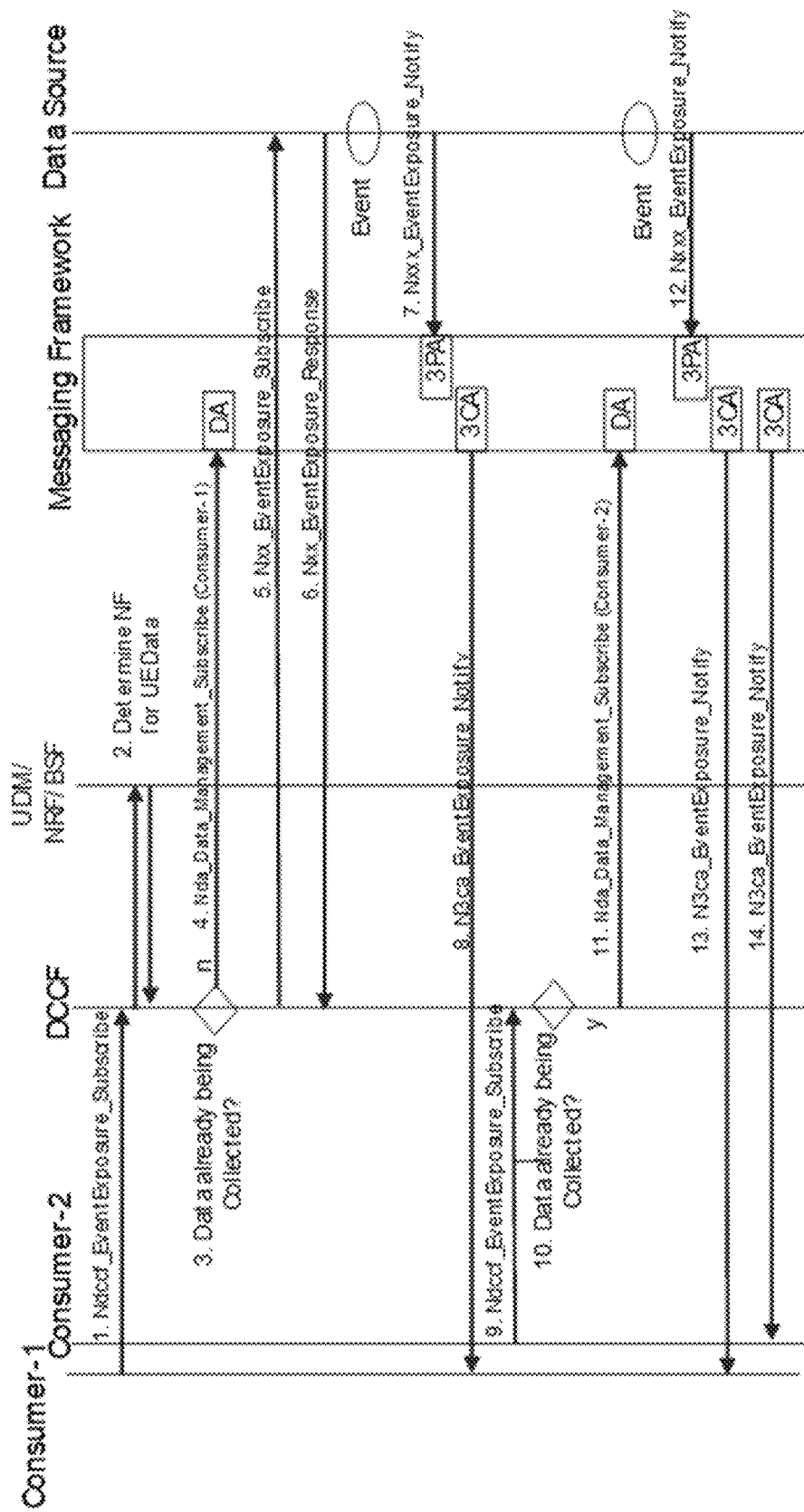
FIG. 7 shows an example of data collection and distribution for event notification according to one specific example embodiment.

In step 1 of FIG. 7, a data consumer-1 (e.g., NWDAF-1) sends a request for data to the DCCF. The message includes the notification target address. Further, the message may indicate whether the requested data should be sent to the notification target address set to data consumer-1 and/or to other data consumers such as a data repository. The notification correlation ID of the consumer-1 is included in the request message and is used for notifications sent to the data consumer-1 (e.g., in step 8).

In step 2, if the request is for UE data, the DCCF may query the UDM/NRF/BSF to determine the NF serving the UE.

In step 3, the DCCF determines the data source (e.g., AMF-1) that can provide the data and checks that the requested data is not already being collected.

Then, in step 4, the DCCF controls the message bus and the adaptors so that the notifications traverse the messaging framework. The subscription to the DA includes a notification correlation ID of the 3PA and the notification correlation ID for data consumer-1 as received in step 1. The DA may associate these with a messaging framework "topic". In addition, the 3PA is provided with its notification correlation ID and the topic. The 3CA will be provided with the consumers notification endpoint, the Notification_Correlation_ID of the consumer and the topic. The 3CA may then subscribe to the topic in the messaging framework.

In step 5, the DCCF sends a subscription request to a NF producer acting as a data source. The subscription includes the notification endpoint and the notification correlation ID of the 3PA that is acting as the receiver for these notifications.

Then in step 6, the data source acknowledges the request.

In step 7, a notification containing the notification correlation ID of the 3PA is sent to the 3PA after an event trigger at the data source. The 3PA publishes the data in the message framework. Further, it may use the "topic" associated with the notification correlation ID of the 3PA received in step 4.

In step 8, when the data is published to the "topic" the messaging framework makes it available to all subscribed 3CAs. In this case the only subscriber is a 3CA serving consumer-1. This 3CA maps the topic to the notification correlation ID of the data consumer received in step 4 (which was originally provided by data consumer-1) and sends the notification to the notification endpoint of data consumer-1.

Then, in step 9, data consumer-2 (e.g., NWDAF-2) sends a request for the same data. The message may indicate whether the requested data should be sent to data consumer-2, and/or to other consumers such as the data repository. The notification correlation ID of consumer-2 is included for notifications sent to data consumer-2.

In step 10, the DCCF determines that the requested data is already being collected from a data source (e.g., AMF-1) and retrieves 3PA ID and the notification correlation ID of the 3PA.

Subsequently, in step 11, the DCCF sends a subscription request to the messaging framework indicating that there is a new subscriber of the data. The subscribe message to the DA provides the 3PA ID, and the 3PA notification correlation ID currently in use and the notification correlation ID for data consumer-2 as received in step 9. The DA selects the existing "topic" corresponding to the 3PA information and sends the 3CA consumer-2's notification endpoint, the Notification_Correlation_ID of consumer-2 and the topic. The 3CA may then subscribe to the topic in the messaging framework. It is to be noted that the 3CA for consumer-2 may be different or the same from 3CA for consumer-1.

In step 12, after an event was triggered in the data source, a notification is sent to the 3PA and the 3PA publishes the data to the corresponding "topic" on the messaging framework.

In steps 13 and 14, when the data is published to the "topic" the messaging framework makes it available to the subscribed 3CAs. In this case the 3CAs serving consumer-1 and consumer-2 receive the data and apply the processing instruction and send the notifications to the notification endpoints of data consumer-1 and consumer-2 using the respective notification correlation ID of consumer-1 and consumer-2.

After having described some example embodiments and some specific examples the impact on services, entities and interfaces is described in the following.

In detail, advantageously, the DCCF within a DMF is suitable as an entity to which at least some exemplary aspects of the invention can be implemented.

Within such or similar environment, the following new features and/or services according to at least some embodiments exhibit particular usefulness:

Ndccf_EventExposure Service:
This service enables a data consumer to request data. The baseline for this service is the Rel-16 NF services used to obtain data from NFs. For example, the baseline for the DCCF service used by a data consumer to obtain UE mobility data would be Namf_EventExposure. The responses providing data are routed via the messaging framework and 3CA. The Ndccf_EventExposure must allow the data consumer to:
1. Identify the data being requested and identify either the NF instance that may provide the data, an area of interest or a UE-ID that the DCCF can use to discover a serving NF
2. Provide formatting conditions and processing instructions that the DCCF can pass to the 3CA in an Nda_Data_Management request Further, the proposed Ndccf_EventExposure service operations are:
Ndccf_EventExposure_Subscribe(Nxxx_Service, NF-ID, UE-ID, Notification Target Address (+Notification Correlation ID), Data Specification, Formatting, Processing Instructions, Start_Time, Expiry Time)—used by the data consumer to request data.

The parameters of the Ndccf_EventExposure_Subscribe service operation are:

| Parameter | Value |
| --- | --- |
| Nxxx_Service | NF type and service that may supply the data (if known to the data consumer) |
| NF-ID | ID of the NF (if known to the data consumer) |
| UE ID | ID of the UE for which data is requested (if applicable) |
| Notification Target Address (+ Notification Correlation ID) | As defined in TS23.502 clause 4.15.1, allows the Event Receiving NF to correlate notifications received from the Event provider with this subscription. A subscription is associated with an unique Notification Target Address (+ Notification Correlation ID). |
| Data Specification | requested data, which may include event ID and other parameters specified in Rel. 16 NWDAF data requests |
| Formatting | as defined for Nda_Data_Management_Subscribe( ) |
| Processing Instructions | as defined for Nda_Data_Management_Subscribe( ) |
| Start_Time | defines the time period when data reporting should start |
| Expiry Time | As defined in TS23.501, clause 4.15.1 |

It is to be noted that "expiry time", denoting the time when a subscription is desired to end, is already an exposure service parameter (c.f. TS 23.501 clause 4.15.1). If a portion of the interval between Start_Time and expiry time is in the past, historical data is requested from a data repository. If a portion of the interval between Start_Time and expiry time is in the future, data is requested from the data source. In both cases the data may be sent to the data consumer via the messaging framework.

Ndccf_EventExposure_Unsubscribe(Subscription Correlation ID)—used by the data consumer when data is no longer wanted.

The parameter of the Ndccf_EventExposure_Unsubscribe service operation is:

| Parameter | Value |
| --- | --- |
| Subscription Correlation ID | the Correlation ID provided by the DCCF when data was requested. |

Further, more than one instance of the above parameters may be specified to allow the data consumer to combine multiple data requests in a single message.

Nda_Data_Management Service:

A new service is required for a DCCF to interact with the messaging framework DCCF adaptor. This service enables a DCCF to request that the messaging framework provides data to a data consumer. Here, Nda_Data_Management must allow:

1. the 3PA to recognize notifications from a data source and to deliver them to the messaging framework
2. the 3CA to obtain data from the messaging framework and send notifications to the data consumer Further, the proposed Nda_Data_Management service operations are:

Nda_Data_Management_Subscribe(Nxxx_Service, Nda_Parameters, Formatting, Processing Instructions)—used when data needs to be sent to a data consumer from the 3CA.

The parameters of the Nda_Data_Management_Subscribe service operation are:

| Parameter | Value |
| --- | --- |
| Nxxx_Service | Identifies the service that will be delivering notifications to the 3PA (eg: Namf_EventExposure) |
| Nda_Parameters | Parameters that identify event notification from the data source including the 3PA notification target address and 3PA notification correlation ID, both of which were supplied to the data source by the DCCF when it requested data, and parameters that identify the data consumer including notification target address and notification correlation ID used by the data consumer when it sent a request for notifications to the DCCF |
| Formatting | Consumer requested notification formatting is used by the 3CA to format notifications. Formatting may include event clubbing, a notification time window, periodic notifications (with or without an event) or consumer triggered notification (e.g., notification suppression), etc. |
| Processing Instructions | Data consumer requested notification processing to reduce the volume of data reported. This may be used by the 3CA to condense multiple notifications to a single notification (report) |

Nda_Data_Management_Unsubscribe(Subscription Correlation ID)—used when data is no longer to be sent to a data consumer from the 3CA.

The parameter of the Nda_Data_Management_Unsubscribe service operation is:

| Parameter | Value |
| --- | --- |
| Subscription Correlation ID | the Correlation ID provided by the DCCF when data was requested. |

N3ca_EventExposure service:

This service enables the 3CA to send data to the data consumer as specified by a DCCF using the Nda_Data_Management service.

Here, possible and/or suitable service operations are:

N3ca/Nda_EventExposure_Notify(Notification Correlation ID, Notification)—used by the 3CA to send data to a data consumer.

The parameters of the N3ca/Nda_EventExposure_Notify service operation are:

| Parameter | Value |
| --- | --- |
| Notification Correlation ID | The notification correlation ID supplied by the data consumer when it requested data using the Ndccf_EventExposure service |
| Notification | The notification supplied by the 3PA through the messaging framework as formatted and processed by the 3CA |

3PA Services:

The 3PA is the notification target specified by the DCCF when the DCCF subscribes to notifications from a data source. The 3PA does not offer any services. Further, notifications received from a data source are sent to the messaging framework according to the instructions the 3PA received from the DA.

It is to be further noted that it is planned that 3GPP will standardize the Interfaces between the 3PA, DA and 3CA.

Moreover, the NRF impacts include new NFs, new parameters in the NF profile and new discovery parameters.

In view of data repository service, in case of a 3GPP defined data repository, a new service is needed for the data repository for the data consumer. This service can be used via the messaging framework, i.e., via an adaptor.

In addition, a data consumer that uses the data management framework sends requests to the DCCF rather than a data producer (as is the case in Release 16).

Further, different formatting conditions and processing instructions are requested by the data consumer to the DCCF.

Figure 8:
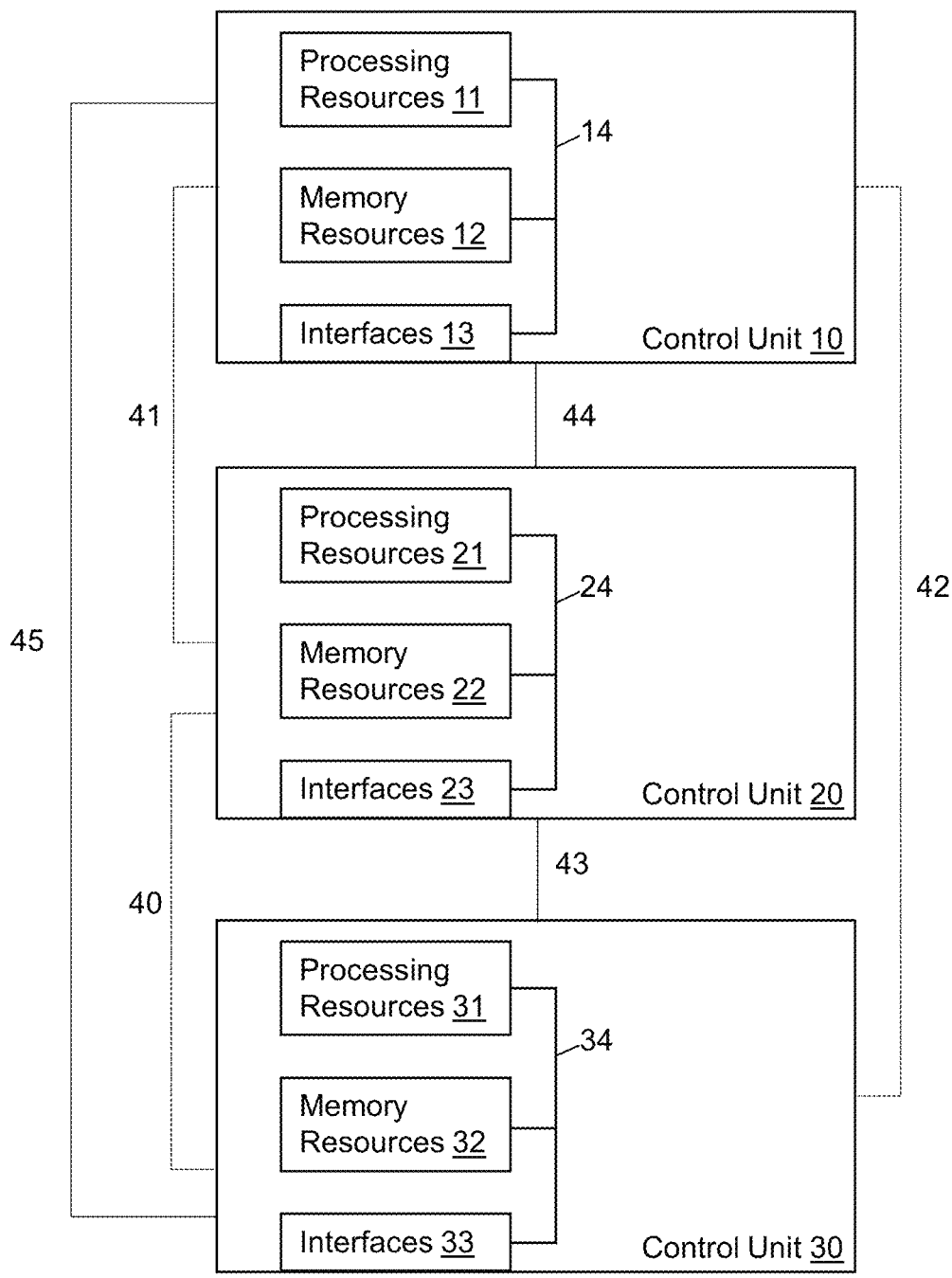
FIG. 8 shows a schematic block diagram illustrating a configuration of control units in which at least some example embodiments are implementable.

Lastly, FIG. 8 depicts control units 10, 20, and 30, each comprising processing resources (e.g. processing circuitry) 11, 21, 31, memory resources (e.g. memory circuitry) 12, 22, 32 and interfaces (e.g. interface circuitry) 13, 23, 33. In at least one exemplary embodiment, the control unit 10 is configured to implemented in and/or used by a first device, e.g. data consumer as described above, the control unit 20 is configured to be implemented in and/or used by a second device, e.g. the data management framework, another data consumer or a data source as described above, and the control unit 30 is configured to be implemented in and/or used by a third device, e.g. a network repository function as described above. Further, each control unit has an own bus system 14, 24, 34 which connects the aforementioned resources such that data can be exchanged between the three components of a unit. In addition, control units 10 and 20 and 30 can be connected via links 40, 41 and 42. Control units 10, 20 and 30 further have additional Xn interfaces 43, 44 and 45 which enable a connection between the respective units and their resources.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

While the above method refers to first to third devices in terms of definitions, the apparatus claims refer to an apparatus of a first to third type.

According to at least some example embodiments, an apparatus is provided within a communication network environment having a possibility for retrieval of historical data indicative of events occurring within the communication network environment and obtained from one or more data sources within the communication network environment. For example, the apparatus comprises the control unit 10, 20 or 30 shown in FIG. 8. According to another example implementation or in addition, the apparatus is configured to execute the method 1 illustrated in FIG. 2.

According to an aspect, the apparatus provided within a communication network environment having a possibility for retrieval of historical data indicative of events occurring within the communication network environment and obtained from one or more data sources within the communication network environment, comprises means for specifying selection criteria to be applied to the historical data for a query to be performed on the historical data kept in a historical data repository associated with an apparatus of a second type, means for specifying at least one processing instruction, wherein the processing instruction determines the generation of a report based on the defined query, means for transmitting the selection criteria and the processing instruction to the apparatus of the second type, and means for receiving the report generated at the apparatus of the second type based on the transmitted selection criteria and processing instruction.

According to an example implementation, the apparatus further comprises means for discovering the apparatus of the second type by inquiring an apparatus of a third type, and means for receiving an indication of the apparatus of the second type from the apparatus of the third type based on a capability of the apparatus of the second type registered at the apparatus of the third type, wherein the capability represents the possibility for retrieval of historical data indicative of events occurring within the communication network environment.

According to an example implementation, the capability of the apparatus of the second type comprises the duration for which historical data is stored in the associated historical data repository.

According to at least some other example embodiments, an apparatus (of a second type) is provided within a communication network environment having a possibility for retrieval of historical data indicative of events occurring within the communication network environment and obtained from one or more data sources within the communication network environment. For example, the apparatus (of the second type) comprises the control unit 10, 20 or 30 shown in FIG. 8. According to another example implementation or in addition, the apparatus (of the second type) is configured to execute the method 2 illustrated in FIG. 3.

According to an aspect, the apparatus provided within a communication network environment having a possibility for retrieval of historical data indicative of events occurring within the communication network environment and obtained from one or more data sources within the communication network environment, comprises means for receiving selection criteria, to be applied to the historical data for a query to be performed on the historical data kept in a historical data repository associated with the apparatus, and at least one processing instruction from an apparatus of a first type, wherein the processing instruction determines the generation of a report based on the defined query, means for generating the report based on the received selection criteria and processing instruction, and means for transmitting the generated report to the apparatus of the first type or to another apparatus indicated by the apparatus of the first type.

The indication of such another apparatus may in an embodiment be part of the processing instruction. This provides flexibility for the first device to indicate a recipient that is different from the first device.

According to an example implementation, the means for generating of the report based on the received selection criteria and processing instruction comprises means for retrieving historical data from the historical data repository associated with the apparatus based on the selection criteria, and means for providing the received processing instructions to a processor unit of the apparatus, wherein the processor unit is configured to process the retrieved historical data based on the received processing instruction to generate the report.

According to an example implementation, the apparatus further comprises means for providing a new service capability at the apparatus, and means for registering the apparatus with its configured capability at an apparatus of a third type, wherein the capability represents the possibility for retrieval of historical data indicative of events occurring within the communication network environment.

In an example implementation, the apparatus further comprises means for collecting historical data from at least one data source, and means for storing the collected historical data in the historical data repository associated with the apparatus.

According to an example implementation, the capability of the apparatus comprises the duration for which historical data is stored in the associated historical data repository.

In an example implementation, the events occurring within the communication network environment are one or more of presence of user equipment in a predetermined area within a predetermined time duration, number and/or type of used services, number of times a access and mobility management function was overloaded within a predetermined time duration, and the one or more data sources is one or more of network function; network data analytics function; application function and network exposure function; and operation, administration, and maintenance.

According to an example implementation, the selection criteria comprise at least one of a plurality of events and metadata related thereto.

The following paragraphs describe further examples of possible aspects and implementations.

Example 1. A method, comprises: providing within a communication network environment a possibility for retrieval of historical data indicative of events occurring within the communication network environment and obtained from one or more data sources within the communication network environment, specifying selection criteria at a first device to be applied to the historical data for a query to be performed on the historical data kept in a historical data repository associated with a second device, specifying at least one processing instruction at the first device, wherein the processing instruction determines the generation of a report based on the defined query, transmitting the selection criteria and the processing instruction to the second device, and receiving the report generated at the second device based on the transmitted selection criteria and processing instruction.

Example 2. The method according to Example 1, wherein the method further comprises discovering the second device by inquiring a third device, and receiving an indication of the second device from the third device based on a capability of the second device registered at the third device, wherein the capability represents the possibility for retrieval of historical data indicative of events occurring within the communication network environment.

Example 3. The method according to Example 2, wherein the capability of the second device comprises the duration for which historical data is stored in the associated historical data repository.

Example 4. A method comprises providing within a communication network environment a possibility for retrieval of historical data indicative of events occurring within the communication network environment and obtained from one or more data sources within the communication network environment, receiving selection criteria, to be applied to the historical data for a query to be performed on the historical data kept in a historical data repository associated with a second device, and at least one processing instruction from a first device, wherein the processing instruction determines the generation of a report based on the defined query, generating the report based on the received selection criteria and processing instruction, transmitting the generated report to the first device or another device indicated by the first device.

Example 5. The method according to Example 4, wherein the generating of the report based on the received selection criteria and processing instruction comprises: retrieving historical data from the historical data repository associated with the second device based on the selection criteria, providing the received processing instructions to a processor unit of the second device, and processing, by the processor unit, the retrieved historical data based on the received processing instruction to generate the report.

Example 6. The method according to Example 4 or 5, further comprising providing a new service capability at the second device, and registering the second device with its configured capability at a third device, wherein the capability represents the possibility for retrieval of historical data indicative of events occurring within the communication network environment.

Example 7. The method according to Example 6, further comprising collecting historical data from at least one data source, and storing the collected historical data in the historical data repository associated with the second device.

Example 8. The method according to Example 6, wherein the capability of the second device comprises the duration for which historical data is stored in the associated historical data repository.

Example 9. The method according to any one of the preceding Examples, wherein events occurring within the communication network environment are one or more of presence of user equipment in a predetermined area within a predetermined time duration, number and/or type of used services, number of times a access and mobility management function was overloaded within a predetermined time duration, and the one or more data sources is one or more of network function; network data analytics function; application function and network exposure function; and operation, administration, and maintenance.

Example 10. The method according to any one of the preceding Examples, wherein the selection criteria comprise at least one of a plurality of events and metadata related thereto.

Example 11. An apparatus provided within a communication network environment having a possibility for retrieval of historical data indicative of events occurring within the communication network environment and obtained from one or more data sources within the communication network environment, the apparatus comprising at least one processor and at least one memory including computer program code, the at least one memory and the computer program code configured to, with the at least one processor, cause the apparatus at least to perform: specifying selection criteria to be applied to the historical data for a query to be performed on the historical data kept in a historical data repository associated with an apparatus of a second type, specifying at least one processing instruction, wherein the processing instruction determines the generation of a report based on the defined query, transmitting the selection criteria and the processing instruction to the apparatus of the second type, and receiving the report generated at the apparatus of the second type based on the transmitted selection criteria and processing instruction.

Example 12. The apparatus according to Example 11, wherein the at least one memory and the computer program code are configured to, with the at least one processor, cause the apparatus to further perform: discovering the apparatus of the second type by inquiring an apparatus of a third type, and receiving an indication of the apparatus of the second type from the apparatus of the third type based on a capability of the apparatus of the second type registered at the apparatus of the third type, wherein the capability represents the possibility for retrieval of historical data indicative of events occurring within the communication network environment.

Example 13. The apparatus according to Example 12, wherein the capability of the apparatus of the second type comprises the duration for which historical data is stored in the associated historical data repository.

Example 14. An apparatus provided within a communication network environment having a possibility for retrieval of historical data indicative of events occurring within the communication network environment and obtained from one or more data sources within the communication network environment, the apparatus comprising at least one processor and at least one memory including computer program code, the at least one memory and the computer program code configured to, with the at least one processor, cause the apparatus at least to perform: receiving selection criteria, to be applied to the historical data for a query to be performed on the historical data kept in a historical data repository associated with the apparatus, and at least one processing instruction from an apparatus of a first type, wherein the processing instruction determines the generation of a report based on the defined query, generating the report based on the received selection criteria and processing instruction, transmitting the generated report to the apparatus of the first type or to another apparatus indicated by the apparatus of the first type.

Example 15. The apparatus according to Example 14, wherein
  the generating of the report based on the received selection criteria and processing instruction comprises:
  retrieving historical data from the historical data repository associated with the apparatus based on the selection criteria, and
  providing the received processing instructions to a processor unit of the apparatus, wherein
  the processor unit is configured to process the retrieved historical data based on the received processing instruction to generate the report.

Example 16. The apparatus according to Example 14 or 15, wherein the at least one memory and the computer program code are configured to, with the at least one processor, cause the apparatus to further perform:
  providing a new service capability at the apparatus, and
  registering the apparatus with its configured capability at an apparatus of a third type, wherein the capability represents the possibility for retrieval of historical data indicative of events occurring within the communication network environment.

Example 17. The apparatus according to Example 16, wherein the at least one memory and the computer program code are configured to, with the at least one processor, cause the apparatus to further perform:
  collecting historical data from at least one data source, and
  storing the collected historical data in the historical data repository associated with the apparatus.

Example 18. The apparatus according to Example 16, wherein the capability of the apparatus comprises the duration for which historical data is stored in the associated historical data repository.

Example 19. The apparatus according to any one of Examples 11 to 18, wherein
  events occurring within the communication network environment are one or more of presence of user equipment in a predetermined area within a predetermined time duration, number and/or type of used services, number of times a access and mobility management function was overloaded within a predetermined time duration, and
  the one or more data sources is one or more of network function; network data analytics function; application function and network exposure function; and operation, administration, and maintenance.

Example 20. The apparatus according to any one of Examples 11 to 19, wherein the selection criteria comprise at least one of a plurality of events and metadata related thereto.

Example 21. A non-transitory computer-readable storage medium storing a program comprising software code portions that, when run on a processor of an apparatus provided within a communication network environment having a possibility for retrieval of historical data indicative of events occurring within the communication network environment and obtained from one or more data sources within the communication network environment, cause the processor to perform:
- specifying selection criteria to be applied to the historical data for a query to be performed on the historical data kept in a historical data repository associated with an apparatus of a second type,
- specifying at least one processing instruction,
  - wherein the processing instruction determines the generation of a report based on the defined query,
- transmitting the selection criteria and the processing instruction to the apparatus of the second type, and
- receiving the report generated at the apparatus of the second type based on the transmitted selection criteria and processing instruction.

Example 22. A non-transitory computer-readable storage medium storing a program comprising software code portions that, when run on a processor of an apparatus provided within a communication network environment having a possibility for retrieval of historical data indicative of events occurring within the communication network environment and obtained from one or more data sources within the communication network environment, cause the processor to perform:
- receiving selection criteria, to be applied to the historical data for a query to be performed on the historical data kept in a historical data repository associated with the apparatus, and at least one processing instruction from an apparatus of a first type,
  - wherein the processing instruction determines the generation of a report based on the defined query,
- generating the report based on the received selection criteria and processing instruction,
- transmitting the generated report to the apparatus of the first type or to another apparatus indicated by the apparatus of the first type.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. A method of an apparatus comprising a historical data repository, the method comprising:
   - receiving, from a device comprising a data consumer, selection criteria to be applied to historical data stored in the historical data repository and indicative of events occurring within a communication network, at least one formatting condition that indicates when a report is to be sent, and at least one processing instruction, wherein the data consumer comprises a network data analytics function (NWDAF);
   - retrieving the historical data comprising multiple notifications, from the historical data repository, based on the selection criteria;
   - generating a report from the historical data based on the at least one formatting condition and the at least one processing instruction, wherein the report comprises a lesser amount of data than the historical data comprising the multiple notifications; and
   - transmitting the report to the device associated with the data consumer comprising the NWDAF or to another device indicated by the device associated with the data consumer comprising the NWDAF.

2. The method according to claim 1, wherein
   the generating of the report from the historical data based on the at least one formatting condition and the at least one processing instruction comprises:
   - providing the at least one formatting condition and the at least one processing instruction to a processor unit of the apparatus, and
   - processing, by the processor unit, the historical data of the retrieving based on the at least one formatting condition and the at least one processing instruction, to generate the report.

3. The method according to claim 1, further comprising
   - providing a configured service capability at a network function for data collection coordination, the apparatus comprising the network function for data collection coordination, and
   - registering the network function for data collection coordination with its configured service capability at a third device, wherein the configured service capability represents the possibility for retrieval of the historical data indicative of events occurring within the communication network.

4. The method according to claim 3, further comprising
   - collecting the historical data from at least one data source, and
   - storing the historical data of the collecting in the historical data repository.

5. The method according to claim 3, wherein the configured service capability of the network function for data collection coordination comprises a duration for which historical data is stored in the historical data repository.

6. The method according to claim 1, wherein the events occurring within the communication network comprise one or more of:
   - presence of user equipment in a predetermined area within a predetermined time duration,
   - use of a service, or
   - an overload of an access and mobility management function within a predetermined time duration, and
   - wherein the one or more data sources comprise one or more of:
   - a network function;
   - a network data analytics function;
   - an application function;
   - a network exposure function; or
   - an operation, administration, and maintenance function.

7. The method according to claim 1, wherein the selection criteria comprise at least one of a plurality of events and metadata related thereto.

8. The method according to claim 1, wherein the at least one formatting condition comprises one or more of the following: a notification event clubbing, a notification time window, a cross event reference-based notification, a consumer triggered notification, a time-based notification, or a mathematical calculation-based notification.

9. The method according to claim 1, wherein the report comprises a statistical of one of more of the following: a frequency or count of movements of one or more user equipment (UEs), a location distribution of the one or more UEs, or time for which respective ones of the one or more UEs were located in a certain area.

10. The method according to claim 9, wherein generating the report comprises generating a statistical analysis of the historical data.

11. An apparatus for a communication network, the apparatus comprising a data consumer comprising a network data analytics function (NWDAF), the apparatus comprising at least one processor and at least one memory including computer program code, which when executed by the at least one processor, cause the apparatus at least to perform:

specifying selection criteria to be applied to historical data indicative of events occurring with the communication network, the historical data stored in a historical data repository associated with an apparatus of a second type, specifying at least one processing instruction,
  wherein the processing instruction determines generation of a report from the historical data comprising multiple notifications from the historical data repository based on the selection criteria, transmitting the selection criteria and the processing instruction to the apparatus of the second type, and receiving the report generated at the apparatus of the second type based on the selection criteria and processing instruction, wherein the report is received based on at least one formatting condition that indicates with the report is to be sent by the apparatus of the second type, and wherein the report comprises a lesser amount of data than the historical data comprising the multiple notifications.

12. The apparatus according to claim 11, wherein the computer program code, when executed by the at least one processor, cause the apparatus to further perform:
  discovering the apparatus of the second type by inquiring an apparatus of a third type, and
  receiving an indication of the apparatus of the second type from the apparatus of the third type based on a configured service capability of the apparatus of the second type registered at the apparatus of the third type,
  wherein the configured service capability represents a possibility for retrieval of the historical data indicative of the events occurring within the communication network.

13. The apparatus according to claim 12, wherein the configured service capability of the apparatus of the second type comprises a duration for which the historical data is stored in the historical data repository.

14. The apparatus according to claim 11, wherein the events occurring within the communication network comprise one or more of:
  presence of user equipment in a predetermined area within a predetermined time duration,
  use of a service, or
  an overload of an access and mobility management function within a predetermined time duration, and
  wherein the one or more data sources comprise one or more of:
  a network function;
  a network data analytics function;
  an application function;
  a network exposure function; or
  an operation, administration, and maintenance function.

15. The apparatus according to claim 11, wherein the selection criteria comprise at least one of a plurality of events and metadata related thereto.

16. An apparatus for a communication network,
the apparatus comprising at least one processor and at least one memory including computer program code, which when executed by the at least one processor, cause the apparatus at least to perform:

receiving, from a device comprising a data consumer, selection criteria to be applied to the historical data stored in the historical data repository and indicative of events occurring within the communication network, at least one formatting condition that indicates when a report is to be sent, and at least one processing instruction, wherein the data consumer comprises a network data analytics function (NWDAF);

retrieving the historical data comprising multiple notifications, from the historical data repository, based on the selection criteria;

generating a report from the historical data based on the at least one formatting condition and the at least one processing instruction, wherein the report comprises a lesser amount of data than the historical data comprising the multiple notifications; and transmitting the report to the device comprising the data consumer comprising the NWDAF or to another device indicated by the device comprising the data consumer comprising the NWDAF.

17. The apparatus according to claim 16, wherein
the generating the report based on the at least one formatting condition, and the at least one processing instruction comprises:
providing the at least one formatting condition and the at least one processing instruction to a processor unit of the at least one processor of the apparatus, wherein
the processor unit is configured to process the historical data of the retrieving based on the at least one formatting condition and the at least one processing instruction to generate the report.

18. The apparatus according to claim 16, wherein the computer program code, when executed by the at least one processor, cause the apparatus to further perform:
  providing a configured service capability at the apparatus, and
  registering the apparatus with its configured service capability at a device, wherein the configured service capability represents the possibility for retrieval of the historical data indicative of the events occurring within the communication network.

19. The apparatus according to claim 18, wherein the computer program code, when executed by the at least one processor, cause the apparatus to further perform:
  collecting the historical data from at least one data source, and
  storing the historical data of the collecting in the historical data repository.

20. The apparatus according to claim 18, wherein the configured service capability of the apparatus comprises a duration for which historical data is stored in the historical data repository.

* * * * *

UNITED STATES PATENT AND TRADEMARK OFFICE
CERTIFICATE OF CORRECTION

PATENT NO. : 12,081,420 B2
APPLICATION NO. : 17/449711
DATED : September 3, 2024
INVENTOR(S) : Saurabh Khare et al.

It is certified that error appears in the above-identified patent and that said Letters Patent is hereby corrected as shown below:

In the Claims

In Column 24, Line 57, Claim 9, delete "one of more" and insert -- one or more --, therefor.

Signed and Sealed this
Tenth Day of December, 2024

Katherine Kelly Vidal
*Director of the United States Patent and Trademark Office*